(No Model.)
P. CAREY.
PAPER TUBE.
No. 489,927.　　　　　　　　　Patented Jan. 17, 1893
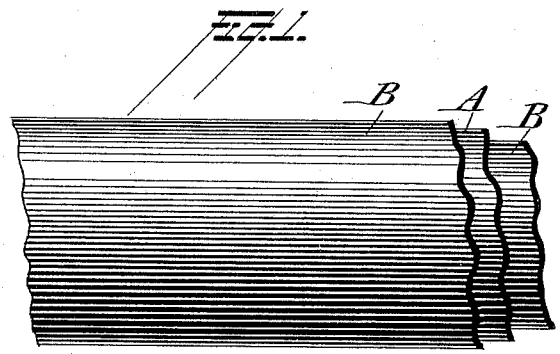
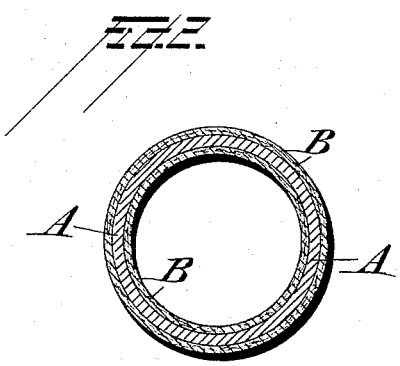
Attest:
F. H. Schott
Henry D. Finckel
Inventor,
Philip Carey,
by Arthur Stem
Attorney.

UNITED STATES PATENT OFFICE.

PHILIP CAREY, OF CINCINNATI, OHIO.

PAPER TUBE.

SPECIFICATION forming part of Letters Patent No. 489,927, dated January 17, 1893.

Application filed January 30, 1891. Serial No. 379,664. (No model.)

*To all whom it may concern:*

Be it known that I, PHILIP CAREY, a citizen of the United States, residing at Cincinnati, in the county of Hamilton and State of Ohio, have invented certain new and useful Improvements in Paper Tubes for Electrical Purposes and the Like, of which the following is a full, clear, and exact description, reference being had to the accompanying drawings, forming part of this specification.

My improvement relates to paper tubes intended to serve as conduits generally but more especially for speaking tubes, electric light wires and the like, and it consists of such improvements in construction and treatment as to render said tubes practically fire and water proof.

In the drawings, Figure 1 represents, partly in elevation and partly in section, a short piece of the tube; and Fig. 2 a lateral section of the same.

In my improvements the manner of making and the methods of treating the tube varies somewhat in accordance with the character of the tube required. In some cases as shown in the drawings I use a layer of water proof paper A between two layers of asbestus paper B B the whole properly secured together in the form of a tube. The tube is then treated with soluble glass in the well known way to render it fire proof and it is then ready for use. This treatment of soluble glass is an essential element of the manufacture, as without it, the asbestus will absorb water in its natural state. In constructing the tube the layer A is first treated with wax or any kind of oil produced from crude petroleum (except kerosene or naphtha) mixed with coal tar pitch or asphalt. This method of treatment gives good water proof results. The layer A is then coated on both sides with asbestus B B and the whole tube treated with soluble glass to render same fire proof. In this way a tube is produced that is practically both water and fire proof. The soluble glass alone may not perhaps render the tube permanently water proof but the water proof paper in connection with the soluble glass and asbestus renders the tube both fire and water proof.

Having thus described my invention, what I claim and desire to secure by Letters Patent, is:—

1. A tube composed of a layer of water-proof paper covered with a layer of asbestus treated with soluble glass, substantially as described.

2. A tube composed of a layer of water-proof paper and interior and exterior layers of asbestus treated with soluble glass, substantially as described.

PHILIP CAREY.

Witnesses:
  NATHANIEL WRIGHT, Jr.,
  GEORGE HEIDMAN.